(12) United States Patent
Suh

(10) Patent No.: US 7,158,674 B2
(45) Date of Patent: Jan. 2, 2007

(54) SCENE CHANGE DETECTION APPARATUS

(75) Inventor: Jong Yeul Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 780 days.

(21) Appl. No.: 10/328,842

(22) Filed: Dec. 24, 2002

(65) Prior Publication Data
US 2003/0123726 A1    Jul. 3, 2003

(30) Foreign Application Priority Data
Dec. 27, 2001    (KR) .......................... 10-2001-86096

(51) Int. Cl.
*G06T 7/00*    (2006.01)
*G06K 9/00*    (2006.01)
*G06K 9/62*    (2006.01)

(52) U.S. Cl. ....................... 382/170; 382/168; 382/225

(58) Field of Classification Search ................ 382/162, 382/168, 170, 171–172, 225; 709/231; 358/516, 358/518, 522
See application file for complete search history.

(56) References Cited

U.S. PATENT DOCUMENTS

| | | | |
|---|---|---|---|
| 6,512,850 B1 * | 1/2003 | Yaung | 382/225 |
| 6,564,263 B1 * | 5/2003 | Bergman et al. | 709/231 |
| 2001/0017940 A1 * | 8/2001 | Kim et al. | 382/162 |

* cited by examiner

*Primary Examiner*—Duy M. Dang
(74) *Attorney, Agent, or Firm*—Lee, Hong, Degerman, Kang & Schmadeka

(57) ABSTRACT

An apparatus for detecting a scene change is disclosed, which is provided for realizing functions such as a nonlinear browsing of a video, a video indexing and a key frame generation in a personal video recorder or video database. In the apparatus according to the present invention, accumulated histograms are extracted from the received two frames, and then a pixel value corresponding to a specific accumulated distribution of respective accumulated histograms is stored, thereby accurately detecting the scene change by comparing difference of pixel value lists. Also, an illumination change determining part for receiving first and second pixel lists from first and second pixel list extracting parts is additionally included so as to determine whether a brightness change of an image occurs due to a change of illumination conditions. Accordingly, it is possible to detect the scene change without any influence from changes of illumination, a camera flash or other optical elements.

20 Claims, 2 Drawing Sheets

SCENE CHANGE DETECTION APPARATUS

This application claims the benefit of Korean Application No. P2001-86096, filed on Dec. 27, 2001, which is hereby incorporated by reference as if fully set forth herein.

BACKGROUND OF THE INVENTION

Field of the Invention

The present invention relates to an apparatus for detecting a scene change without any influence from an illumination change or a brightness change of an input image.

Description of the Related Art

In general, an apparatus for detecting a scene change is required to provide functions such as a nonlinear browsing of a video, video index and key fame generation in a personal video recorder and a video database.

FIG. 1 shows one of methods for detecting a scene change, which is using a histogram. In the method shown in FIG. 1, the scene change is detected based upon a bin-to-bin difference method of comparing frequency difference of each bin of the histograms between two input images.

FIG. 1 is a block diagram illustrating a related art method for detecting a scene change. Referring to FIG. 1, two frames being adjacent to each other are input to first and second histogram extracting parts 101 and 102 in order to detect the scene change between the two frames. The histograms of each frame are extracted thereby outputting the histograms to a histogram comparing part 103. At this time, the histogram indicates a gray level distribution of the input image. Each gray level indicating brightness of the image is referred to as a bin, and each bin includes the frequency according to the number of pixels having the corresponding gray level value.

In the histogram comparing part 103 for comparing the two histograms, the histograms are compared in a method of comparing and accumulating the frequency of each bin, as shown in Equation 1.

$$E = \sum_{i=0}^{N-1} |h_1(i) - h_2(i)| \quad \text{equation 1}$$

At this time, the $h_1(i)$ and $h_2(i)$ are the respective numbers of pixels of $i^{th}$ numbered bins in the two frames $f_1$ and $f_2$, in which each is the number of pixels having the gray level value of "i" in each image.

The difference E obtained by the histogram comparing part 103 is output to a scene change determining part 104, and the scene change determining part 104 compares the difference E obtained by applying the Equation 1 with a preset threshold value, thereby determining whether the scene change occurs. That is, if the difference E is greater than the preset threshold value, it is determined that the scene change occurs between the two images.

However, the related art apparatus has the following disadvantages.

First, the related art apparatus may have problems when the brightness of the input images is instantaneously changed due to changes of illumination, a camera flash or other optical elements.

Furthermore, the related art apparatus for detecting the scene change has no consideration that histogram distributions of each scene are different from each other when the same scene is photographed in different illumination conditions. Accordingly, even though the scene change does not occur, a false alarm may occur due to an entire illumination change in the related art apparatus for detecting the scene change, thereby making mistakes of determining the scene change.

SUMMARY OF THE INVENTION

Accordingly, the present invention is directed to an apparatus for detecting a scene change that substantially obviates one or more problems due to limitations and disadvantages of the prior art.

An object of the present invention is to provide to an apparatus for detecting a scene change without any influence from changes of illumination, a camera flash or other optical elements.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for detecting a scene change according to the present invention includes first and second accumulated histogram extracting parts receiving two frames and extracting accumulated histograms from the received frames, first and second pixel list extracting parts extracting pixel lists corresponding to a specific accumulated distribution value from the first and second accumulated histogram extracting parts; a histogram comparing part measuring a difference between the two pixel lists, and a scene change determining part determining whether a scene change occurs.

Preferably, the apparatus for detecting the scene change further includes an illumination change determining part receiving first and second pixel lists from first and second pixel list extracting parts, and determining whether a brightness change of an image occurs due to a change of illumination conditions.

Preferably, the scene change determining part calculates an average difference of recent 'M' numbers of frames, sets a value of $\tau \times E_{AVERAGE}$ as a threshold value, so that it is determined that a scene change occurs if the fame difference E measured by the histogram comparing part is greater than the threshold value, meanwhile, it is determined that a scene change does not occur if the frame difference E measured by the histogram comparing part is smaller than the threshold value.

Preferably, the illumination change determining part calculates a centesimal scale of the model D, so that it is determined that the scene change does not occur if the centesimal scale of the model D is below a preset value, and it is determined that the scene change occurs between the two frames if the centesimal scale of the model D is above the preset value.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
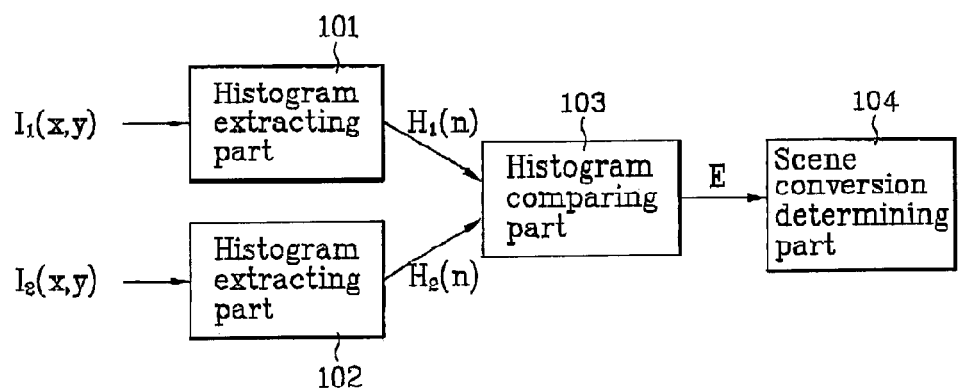
FIG. 1 is a block diagram illustrating a related art apparatus for detecting a scene change.
Figure 2:
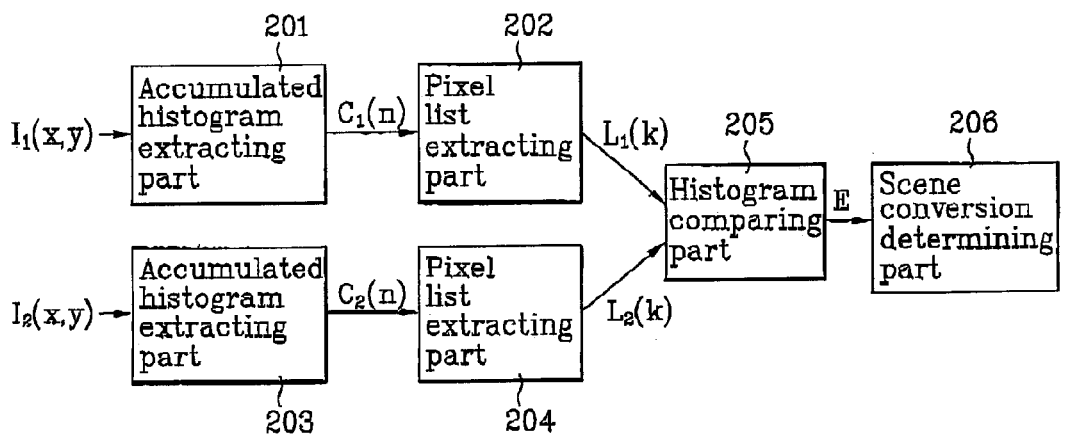
FIG. 2 is a block diagram illustrating an apparatus for detecting a scene change according to the first embodiment of the present invention.

FIG. 2 is a block diagram illustrating an apparatus for detecting a scene change according to the first embodiment of the present invention. Referring to FIG. 2, the apparatus for detecting the scene change includes a first accumulated histogram extracting part 201, a first pixel list exacting part 202, a second accumulated histogram extracting part 203, a second pixel list extracting part 294, a histogram comparing part 205 and a scene change determining part 206.

At this time, the first accumulated histogram extracting part 201 extracts an accumulated histogram of a first frame $I_1(x,y)$, and the first pixel list extracting part 202 extracts a pixel list corresponding to a specific accumulated distribution value from the first accumulated histogram extracting part 201. The second accumulated histogram extracting part 203 extracts an accumulated histogram of a second frame $I_2(x,y)$ being adjacent to the first frame $I_1(x,y)$, and the second pixel list extracting part 204 extracts a pixel list corresponding to a specific accumulated distribution value from the second accumulated histogram extracting part 203. Then, the histogram comparing part 205 compares the first and second histograms to each other with outputs of the first and second pixel list extracting pares 202 and 204. The scene change determining part 206 compares the output from the histogram comparing part 205 with a preset threshold value, thereby determining whether the scene change occurs.

In the apparatus for detecting the scene change according to the first embodiment of the present invention, the first and second accumulated histogram extracting parts 201 and 203 read pixel values of each frame $I_1(x,y)$, $I_2(x,y)$, . . . being input go as to extract the accumulated histogram having "N" numbers of bins from 0 to "N-1" number. Then, if the road pixel value is corresponding to $t^{th}$ numbered bin, each frequency of bins from "t" (t, t+1, t+2, . . ., N-1) is increased one by one.

The aforementioned process steps are repeatedly performed until all pixels are read in the corresponding frame. If all pixels of one frame are read, the accumulated histogram of the corresponding frame is extracted. At this time, the first and second accumulated histogram extracting parts 201 and 203 respectively output the accumulated histograms of the corresponding frames to the first and second pixel list extracting parts 202 and 204. That is, the frequency of the accumulated histogram to $k^{th}$ numbered bin is same as the number of the pixels having the pixel value from 0 to "k".

The accumulated histogram output from the first accumulated histogram extracting pan 201 is input to the first pixel list extracting part 202, so that the first pixel list extracting part 202 outputs a bin value corresponding to a predetermined frequency. Also, the accumulated histogram output from the second accumulated histogram extracting part 203 is input to the second pixel list extracting part 204, so that the second pixel list extracting part 204 outputs a bin value corresponding to a predetermined frequency.

For instance, the first and second pixel list extracting parts 202 and 204 output the bin value having the frequency corresponding to 20%, 40%, 60% and 80% of the total number of the pixels in each frame to the histogram comparing part 205. If the accumulated frequency corresponding to 20% of the total number of pixels is 212, and the bin value is 8, the bin value of the frequency corresponding to 20% is 8, so that 8 is output to the histogram comparing part 205. Accordingly, the fir and second pixel list extracting parts 202 and 204 output lists $L_1(k)$ and $L_2(k)$ respectively including four pixel values (bin values) from each frame. At this time, 'k' may be 0, 1, 2, 3 . . . .

The histogram comparing part 205 calculates the difference E from the first and second pixel lists $L_1(k)$ and $L_2(k)$ according to the following Equation 2, and then outputs the frame difference E to the scene change determining part 206.

$$E = \frac{1}{4}\sum_{k=0}^{3}|L_1(k) - L_2(k)|^2 \qquad \text{equation 2}$$

The scene change determining part 206 compares the difference E of the present frame, which is obtained according to the Equation 2, to the preset threshold value. At this tine, the present threshold value is obtained by calculating an average difference of 15 frames according to the following Equation 3.

$$E_{AVERAGE} = \frac{1}{15}\sum_{k=0}^{15} E_{CURRENT-k} \qquad \text{equation 3}$$

At this time, if the difference E of the present frame is greater than the value of $\tau \times E_{AVERAGE}$, the scene is considered as being changed, thereby outputting "1". Meanwhile, if the difference E of the present frame is smaller than the value of $\tau \times E_{AVERAGE}$, it is considered that the scene change does not occur, thereby outputting "0". In the preferred embodiment of the present invention, $\tau$ is set as 3.

The scene change determining part 206 requires a memory for storing the differences of recent 15 frames, so that ale scene change determining part 206 includes a frame difference register of 15×16 bits. Then, the scene change determining part 206 compares the present frame difference with the average difference of the recent 15 frames. Therefore, if the scene change determining part 206 outputs the value of "0", it is considered that the scene change does not occur, thereby storing the present frame difference after performing a shift calculation as 16 bits. If "1" is output from the scene change determining part 206, it is considered that the scene change occurs, the frame difference register is operated as follows.

Figure 3:
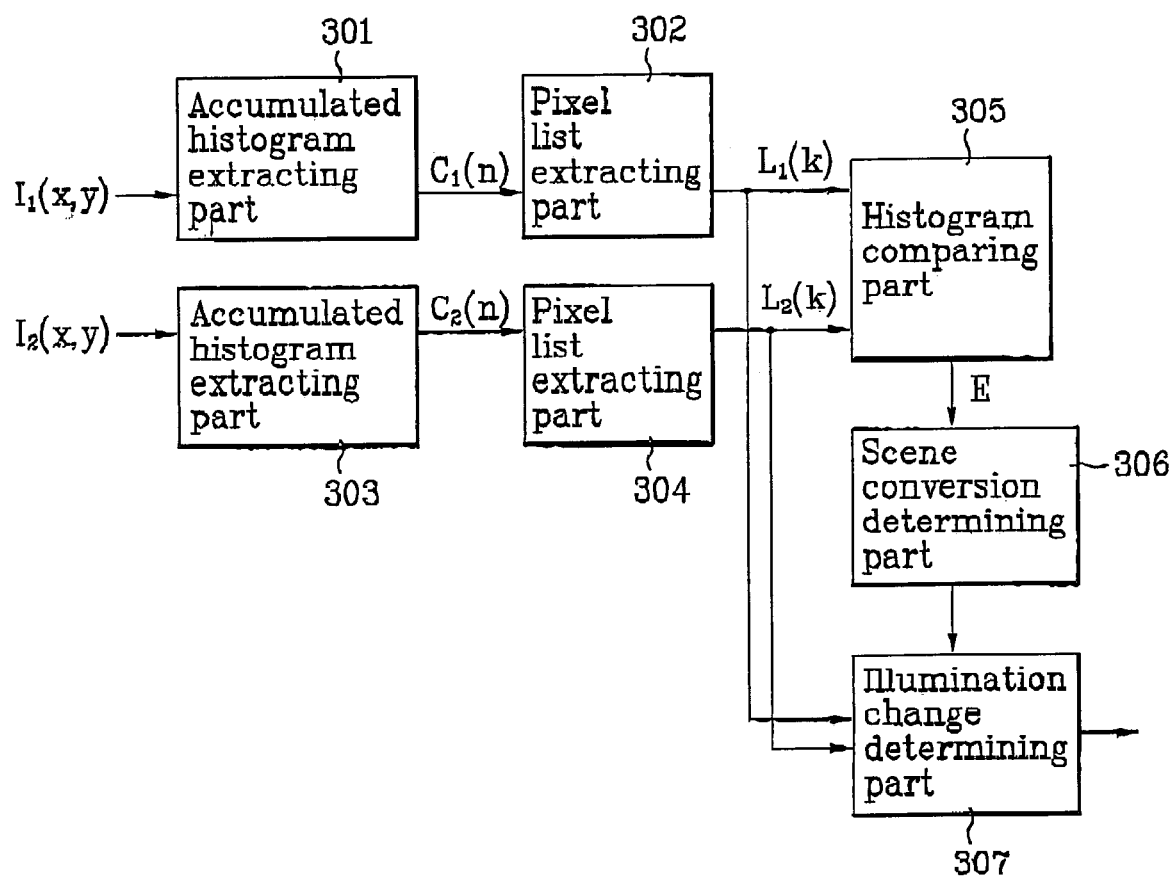
FIG. 3 is a block diagram illustrating an apparatus for detecting a scene change according to the second embodiment of the present invention.

FIG. 3 is a block diagram illustrating an apparatus for detecting a scene change according to the second embodiment of the present invention. If a scene change occurs, an illumination change determining part 307 receiving first and second pixel lists from first and second pixel list extracting parts is additionally operated so as to determine whether a brightness change of an image occurs due to a change of illumination conditions, which makes a difference from the first embodiment of the present invention shown in FIG. 2. In this case, first and second accumulated histogram extracting pans 301 and 302, first and second pixel list extracting parts 302 and 304, a histogram comparing part 305 and a scene change determining part 306 have the same structures as those of the first embodiment of the present invention, and are operated in the same way as those according to the first embodiment of the present invention, as shown in FIG. 2.

If the scene change determining part 306 outputs "1" value, it is considered that the scene change occurs, so that the illumination change determining part 307 is operated. In this state, first and second pixel lists $L_1(k)$ and $L_2(k)$ are input to the illumination change determining part 307 from the first and second pixel list extracting pans 302 and 304, so that the illumination change determining pan 307 determines whether scan; change between two frames occurs due to illumination conditions. Therefore, if the change between the frames occurs due to illumination conditions, it is considered that the scene change does not occur, so that process steps for storing the present frame difference and performing the shift calculation as 16 bits are not performed.

The illumination change determining part 307 will be explained as follows. A model for the change of the illumination conditions is assumed as the following Equation 4.

$$I_2(x,y) = \alpha I_1(x,y) + \beta \qquad \text{equation 4}$$

It is assumed that there is a linear change of the illumination conditions being defined by two parameters $\alpha$ and $\beta$ between the two frames $I_1(x,y)$ and $I_2(x,y)$. Accordingly, in case of that the change of the illumination conditions occurs, the change of the histogram between the two images is shown by the change of the two parameters $\alpha$ and $\beta$. If the two images are include in one scene, the histogram is constantly changed by the two parameters. However, if the two images are included in different scenes, the histogram is changed without any relations with the parameters. After calculating $\alpha$ and $\beta$ values from the histogram lists, a centesimal scale is drawn in relation with the model, thereby determining the change of the illumination conditions. At this time, $\alpha$ and $\beta$ values are calculated by applying least square functions according to the following Equation 5.

$$\alpha = \frac{4 \times \sum_{j=0}^{3}(L_1(j) \times L_2(j)) - \sum_{j=0}^{3} L_1(j) \times \sum_{j=0}^{3} L_2(j)}{4 \times \sum_{j=0}^{3}(L_1(j))^2 - \left(\sum_{j=0}^{3} L_1(j)\right)^2} \qquad \text{equation 5}$$

$$\beta = \frac{\sum_{j=0}^{3}(L_1(j))^2 \times \sum_{j=0}^{3} L_2(j) - \sum_{j=0}^{3} L_1(j) \times \sum_{j=0}^{3}(L_1(j) \times L_2(j))}{4 \times \sum_{j=0}^{3}(L_1(j))^2 - \left(\sum_{j=0}^{3} L_1(j)\right)^2}$$

The centesimal scale of the model using the histogram list is calculated in a following Equation 6.

$$D = \frac{1}{4} \sum_{j=1}^{4} \frac{|\alpha L_1(j) + \beta L_2(j)|}{L_2(j)} \qquad \text{equation 6}$$

If the centesimal scale of the model, D calculated in Equation 6, is 0.15 or less, the illumination change determining part 307 considers the illumination conditions to be changed, thereby outputting "1". Therefore, it is determined that the scene change does not occur between the two frames. Meanwhile, if the centesimal scale of the model, D, is above 0.15, the illumination change determining part 307 outputs "0", so that it is considered that the scene change occurs between the two frames.

In the apparatus for detecting the scene change according to the second embodiment of the present invention, if the scene change determining part 306 outputs "0", it is determined that the scene change does not occur, so that a process step for the update to the frame difference register of the scene change determining part 306 is performed. Meanwhile, if the scene change determining pare 306 outputs "1", the illumination change determining part 307 performs the aforementioned process steps repeatedly. At this time, if the illumination change deter g part 307 outputs "1", it is also determined that the scene change does not occur, so that next frame is input, and then the aforementioned process steps are repeatedly performed. In this case, a process step for the update to the frame difference register of the scene change determining part 306 is not performed.

However, if the illumination change determining part 307 outputs "0", it is determined that the scene change occurs, so that the process step for the update to the frame difference register of the scene change determining part 306 is not performed, and the image of the next fame is input. Then, the process stop for detecting the scene change is repeatedly performed until running a video is completed.

The apparatus for detecting the scene change according to the present invention has the following advantages.

First, the apparatus for detecting the scene change according to the present invention can be used to correctly detect the scene change for a video search, a nonlinear browsing of the video and a video index generation in a personal video recorder or a video database.

Also, in the apparatus for detecting the scene change according to the present invention, the two frames ale input, and the accumulated histogram is extracted. Then, a pixel value corresponding to a specific accumulated distribution for each accumulated histogram is recorded, and differences in a pixel value list are compared to detect the scene change. Therefore, it is possible to accurately detect whether the scene change occurs.

Furthermore, the pixel value list is applied to the centesimal scale of the brightness change model of the image according to the illumination changes, thereby detecting whether the difference of the two histograms occurs due to the illumination changes. Accordingly, it is possible to detect the scene change without any influence from changes of illumination, a camera flash or other optical elements.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. An apparatus for detecting a scene change comprising;
a first accumulated histogram extracting part for receiving a first frame and extracting an accumulated histogram to the first frame;
a first pixel list extracting part for extracting a pixel list corresponding to at least one specific accumulated distribution value from the first accumulated histogram extracting part;
a second accumulated histogram extracting part for receiving a second frame adjacent to the first frame and extracting an accumulated histogram of the second frame;
a second pixel list extracting part for extracting a pixel list corresponding to at least one specific accumulated distribution value from the second accumulated histogram extracting part;
a histogram comparing part for measuring a frame difference by comparing outputs of the first and second pixel list extracting parts; and
a scene change determining part for comparing the frame difference measured by the histogram comparing part with a preset threshold value, thereby determining whether the scene change occurs.

2. The apparatus of claim 1, wherein the first and second accumulated histogram extracting parts respectively extract the accumulated histogram having "N" numbers of bins from 0 to "N-1" number with respect to a corresponding frame.

3. The apparatus of claim 2, wherein the first and second accumulated histogram extracting pats repeat process stops for reading pixel values of each frame, and increasing frequency of each bin from $t^{th}$ numbered bin in case of that the read pixel value is corresponding to $t^{th}$ numbered bin, until all pixels of the corresponding frame are read.

4. The apparatus of claim 1, wherein the first and second pixel list extracting parts generate a pixel list by applying a process for outputting a bin value having a specific ratio of the total number of the pixels of a corresponding frame as a pixel value of the corresponding frame to at least one predetermined ratio.

5. The apparatus of claim 1, wherein the histogram comparing part calculates a frame difference E by applying the first and second pixel lists $L_1(k)$ and $L_2(k)$ according to the following equation.

$$E = \frac{1}{4}\sum_{k=0}^{3}|L_1(k) - L_2(k)|^2$$

6. The apparatus of claim 1, wherein the scene change determining part calculates an average difference of recent 'M' (natural number) numbers of flames, sets a value of $\tau \times E_{AVERAGE}$ as a threshold value, so that the scene change determining part determines that a scene change occurs if the frame difference E measured by the histogram comparing part is greater than the threshold value, meanwhile, the scene change determining part determines that a scene change does not occur if the frame difference E measured by the histogram comparing part is smaller than the threshold value.

7. The apparatus of claim 6, wherein the scene change determining part includes a frame difference register of M×L bits for storing frame differences of recent 15 frames, so that a present frame difference is stored after performing a shift calculation as L bits with respect to the frame difference register if the scene change determining part determines that a scene change does not occur.

8. The apparatus of claim 1, further comprising an illumination change determining part for receiving first and second pixel lists from first and second pixel list extracting parts, and determining whether a brightness change of an image occurs due to a change of illumination conditions, if the scene change determining part determines that a scene change occurs.

9. The apparatus of claim 8, wherein, if the scene change determining part determines that a scene change occurs, the illumination change determining part calculates two parameters α and β for realizing a linear change of illumination conditions between two frames by applying a least square function to the first and second pixel lists of the first and second pixel list extracting parts, and obtains a model centesimal scale D by applying the parameters α and β to the following equation, and determines whether a scene change occurs by comparing the model centesimal scale D with a preset threshold value.

$$D = \frac{1}{4}\sum_{j=1}^{4}\frac{|\alpha L_1(j) + \beta - L_2(j)|}{L_2(f)}$$

10. The apparatus of claim 9, wherein the two parameters, α and β values, are calculated according to the following equation.

$$\alpha = \frac{4 \times \sum_{j=0}^{3}(L_1(j) \times L_2(j)) - \sum_{j=0}^{3}L_1(j) \times \sum_{j=0}^{3}L_2(j)}{4 \times \sum_{j=0}^{3}(L_1(j))^2 - \left(\sum_{j=0}^{3}L_1(j)\right)^2}$$

$$\beta = \frac{\sum_{j=0}^{3}(L_1(j))^2 \times \sum_{j=0}^{3}L_2(j) - \sum_{j=0}^{3}L_1(j) \times \sum_{j=0}^{3}(L_1(j) \times L_2(j))}{4 \times \sum_{j=0}^{3}(L_1(j))^2 - \left(\sum_{j=0}^{3}L_1(j)\right)^2}$$

11. The apparatus of claim 9, wherein, if the model centesimal scale D is below the threshold value, the illumination change determining part determines that the scene change does not occur between the two frames, so that the shift calculation is performed to the frame difference register of M×L bits.

12. The apparatus of claim 9, wherein, if the model centesimal scale D is above the threshold value, the illumination change determining part determines that the scene change occurs between the two frames, so that the shift calculation is not performed to the frame difference register of M×L bits, thereby storing a present frame difference.

13. An apparatus for detecting a scene change comprising:
a first accumulated histogram extracting part for receiving a first frame and extracting an accumulated histogram to the first frame;
a first pixel list extracting part for extracting a pixel list corresponding to at least one specific accumulated distribution value from the first accumulated histogram extracting part;

a second accumulated histogram extracting part for receiving a second frame being adjacent to the first frame and extracting an accumulated histogram of the second frame;

a second pixel list extracting part for extracting a pixel list corresponding to at least one specific accumulated distribution value from the second accumulated histogram extracting part;

a histogram comparing part for measuring a frame difference by comparing outputs of the first and second pixel list extracting parts;

a scene change determining part for comparing the frame difference measured by the histogram comparing part with a preset threshold value, determining that a scene change occurs if a frame difference measured by the histogram comparing part is greater than a preset threshold value, and determining that a scene change docs not occur if a frame difference E measured by the histogram comparing part is smaller than a preset threshold value; and an illumination change determining pad for receiving first and second pixel lists from first and second pixel list extracting parts, and determining whether a brightness change of an image occurs due to a change of illumination conditions.

14. The apparatus of claim 13, wherein the first and second accumulated histogram extracting parts respectively extract the accumulated histogram having "N" numbers of bins from 0 to "N-1 " number with respect to a corresponding frame, and repeat process steps for reading pixel values of each frame and increasing frequency of each bin from $t^{th}$ numbered bin if the read pixel value is corresponding to $t^{th}$ numbered bin, until all pixels of the corresponding frame are read.

15. The apparatus of claim 13, wherein the histogram comparing part calculates a frame difference E by applying the first and second pixel lists $L_1(k)$ and $L_2(k)$ according to the following equation.

$$E = \frac{1}{4}\sum_{k=0}^{3}|L_1(k) - L_2(k)|^2$$

16. The apparatus of claim 13, wherein the scene change determining part calculates an average difference of current 'M' (natural number) numbers of frames, sets a value of $\tau \times E_{AVERAGE}$ as a threshold value, so that the a scene change occurs in a case of that the frame difference E measured by the histogram comparing part is greater than the threshold value, meanwhile, the scene change determining part determines that a scene change does not occur if the frame difference E measured by the histogram comparing part is smaller than the threshold value.

17. The apparatus of claim 16, wherein the scene change determining part in frame difference register of M×L bits for storing frame differences of recent 15 frames, so that a present frame difference is stored after performing a shift calculation as L bits with respect to the frame difference register if the scene change determining part determines that a scene change does not occur.

18. The apparatus of claim 13, wherein, if the scene change determining part determines that a scene change occurs, the illumination change determining part calculates two parameters $\alpha$ and $\beta$ for realizing a linear change of illumination conditions between two frames by applying a least square function to the first and second pixel lists generated by the first and second pixel list extracting parts, and obtains a model centesimal scale D by applying parameters $\alpha$ and $\beta$ to the following equation, and determines whether a scene change occurs by comparing the model centesimal scale D a preset threshold value.

$$D = \frac{1}{4}\sum_{j=1}^{4}\frac{|\alpha L_1(j) + \beta - L_2(j)|}{L_2(j)}$$

19. The apparatus of claim 18, wherein, if the model centesimal scale D is below the threshold value, the illumination change determining part determines that the scene change does not occur between the two frames, so that the shift calculation is performed to the frame difference register of M×L bits.

20. The apparatus of claim 18, wherein, if the model centesimal scale D is above the threshold value, the illumination change determining part determines that the scene change occurs between the two frames, so that the shift calculation is not performed to the frame difference register of M×L bits, thereby storing a present frame difference.

* * * * *